Patented June 15, 1948

2,443,291

UNITED STATES PATENT OFFICE 2,443,291

PRODUCTION OF TRICHLOROACETAMIDE

Oscar W. Bauer and John W. Teter, Chicago, Ill., assignors to Sinclair Refining Company, New York, N. Y., a corporation of Maine No Drawing. Application November 6, 1944, Serial No. 562,255

1 Claim. (Cl. 260—561)

This invention relates to an improved process for the production of trichloracetamide.

In accordance with the invention, trichloracetamide is produced by the hydrolysis of trichloracetonitrile with aqueous hydrochloric acid in amount such that it contains about the theoretical amount of water required for hydrolysis of the nitrile to the amide, that is, water is present in approximately stoichiometrical proportions. The hydrolysis is strongly exothermic, and the temperature of the reaction mass must be controlled, either by cooling or by the slow addition of the acid to the reaction vessel or zone. The new process proceeds almost quantitatively, yields as high as 98% or higher being obtained without difficulty. The trichloracetonitrile used need not be highly purified; indeed, it is conveniently supplied to the reaction as the trichloracetonitrile-acetonitrile azeotrope resulting from the distillation of the reaction product of the direct chlorination of acetonitrile, which azeotrope contains about 71 weight per cent of trichloracetonitrile. The acid advantageously used is concentrated (37 weight per cent HCl) aqueous hydrochloric acid, although the concentration of the acid may vary somewhat, that is, somewhat diluted acid may be used. The amount of acid required is that which will supply the water for hydrolysis in slight excess, for example 10%, of acid over that required to supply the stoichiometrical quantity of water is advantageously used.

The invention will be illustrated by the following examples, but it is not limited thereto.

*Example I.*—15.9 parts of the trichloracetonitrile-acetonitrile azeotrope (71 weight per cent trichloracetonitrile) were mixed with 2.4 parts of concentrated hydrochloric acid and the mixture was boiled for 2 to 3 minutes. The source of heat was removed, but the boiling continued for 10 minutes, during which time a precipitate formed. On cooling, a crystal sludge formed. The mass was filtered and the filtrate evaporated to dryness. 12 parts of trichloracetamide, melting at 132–135° C. were obtained.

*Example II.*—53.1 parts of concentrated hydrochloric acid were added in small portions to 342 parts of the azeotrope over a three hour period. The reaction was started by heating after the first six parts of acid had been added. No further heating was required, but external cooling of the reaction mixture was required from time to time to prevent an undue rise in temperature and loss of material through boiling over. Crystals began to form when ⅓ of the acid had been added. When all of the acid was added, the mixture was refluxed for 15 minutes by external heat, cooled and filtered. The filtrate was evaporated and dried over-night in a desiccator. 217 parts of trichloracetamid, M. P. 132–135° C., were obtained. After one recrystallization from water, the product had a melting point of 138.5–139.5° C.

We claim:

The method of preparing trichloracetamide which includes hydrolyzing trichloroacetonitrile with aqueous hydrochloric acid, the proportions of acid and nitrile being such that water is present in approximately stoichiometrical proportions.

OSCAR W. BAUER.
JOHN W. TETER.

REFERENCES CITED

The following references are of record in the file of this patent:

UNITED STATES PATENTS

| Number | Name | Date |
| --- | --- | --- |
| 2,400,463 | Lichty | May 14, 1946 |

FOREIGN PATENTS

| Number | Country | Date |
| --- | --- | --- |
| 522,835 | Great Britain | June 28, 1940 |

OTHER REFERENCES

Steinkopf et al., "Berichte deutsche Chem. Gesell.," vol. 44 (1911), page 2902.

McMaster et al., "Jour. Am. Chem. Soc.," vol. 39 (1917), page 108.

Sidwick, "Organic Chemistry of Nitrogen" (1937), pages 139, 140, 312 and 313.

Krieble et al., "Jour. Am. Chem. Soc.," vol. 61 (1939), pages 560–563.